(12) United States Patent
Wei

(10) Patent No.: US 8,406,553 B2
(45) Date of Patent: Mar. 26, 2013

(54) POISSON DISK SAMPLE MAPS

(75) Inventor: Li-Yi Wei, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 12/504,719

(22) Filed: Jul. 17, 2009

(65) Prior Publication Data

US 2011/0013842 A1 Jan. 20, 2011

(51) Int. Cl.
*G06K 9/40* (2006.01)

(52) U.S. Cl. .......................................... 382/269

(58) Field of Classification Search .................. 382/254, 382/266, 269; 345/611–613; 348/390.1, 348/399.1, 405.1

See application file for complete search history.

(56) References Cited

U.S. PATENT DOCUMENTS

| | | | |
|---|---|---|---|
| 5,920,495 A | 7/1999 | Hicok et al. | |
| 6,400,370 B1 * | 6/2002 | Lee et al. | 345/586 |
| 6,456,340 B1 | 9/2002 | Margulis | |
| 6,496,187 B1 * | 12/2002 | Deering et al. | 345/419 |
| 6,664,955 B1 * | 12/2003 | Deering | 345/418 |
| 6,999,100 B1 * | 2/2006 | Leather et al. | 345/611 |
| 7,364,306 B2 | 4/2008 | Margulis | |
| 7,403,208 B1 * | 7/2008 | Bastos et al. | 345/613 |
| 8,031,205 B2 * | 10/2011 | Brown Elliott et al. | 345/613 |
| 2001/0048435 A1 * | 12/2001 | Deering et al. | 345/441 |
| 2011/0019908 A1 | 1/2011 | Wei | |
| 2011/0292066 A1 | 12/2011 | Wei | |

OTHER PUBLICATIONS

Ramponi et al ("An Adaptive Irregular Sampling Method for Progressive Tranmission", DEEI, University of Trieste, Italy, 1998.*
Bridson "Fast Posson Disk Sampling in Arbitrary Dimensions", Univ. of British Columbia, ACM SIGGRAPH, 2007.*
Jones, Thouis R., "Efficient Generation of Poisson-Disk Sampling Patterns," retrieved at <<http://people.csail.mit.edu/thouis/JonesPoissonPreprint.pdf>>, Journal of Graphics, 2006, vol. 11, No. 2, 10 pages.
Bikker, et al., "A Precalculated Point Set for Caching Shading Information," retrieved at <<http://igad.nhtv.nl/~bikker/files/pointset_PREPRINT.pdf>>, Proceedings of Eurographics 2009, Apr. 2009, 4 pages.

(Continued)

*Primary Examiner* — Claire X Wang
*Assistant Examiner* — Shervin Nakhjavan

(57) ABSTRACT

A map encoding module is described for creating a sample map in which sample values are placed within respective cells of an organizing grid structure, as governed, in part, by a Poisson disk distribution. The map encoding module efficiently represents the locations of the samples using respective integer values. A location determination module can determine a location of a sample value within a particular cell using a decoding algorithm. The decoding algorithm receives selection information and uses a cryptographic hashing algorithm to transform the selection information into location information which identifies the location of the sample value within the particular cell. Various graphics applications can use the map encoding module and the location determination module to reduce aliasing in displayed images.

20 Claims, 13 Drawing Sheets

OTHER PUBLICATIONS

Qu, et al., "A Framework for Sample-Based Rendering with 0-Buffers," retrieved at <<http://www.cse.ust.hk/~huamin/qu_obuffer.pdf>>, Proceedings of the 14th IEEE Visualization, Oct. 2003, pp. 441-448.

Li, et al., "Dual Poisson-Disk Tiling: An Efficient Method for Distributing Features on Arbitrary Surfaces," retrieved at <<http://ieeexplore.ieee.org/stamp/stamp.jsp?arnumber=04479456>>, IEEE Transactions on Visualization and Computer Graphics, vol. 14, No. 5, Sep./Oct. 2008, pp. 982-998.

Li, Hongwei, "Texture Synthesis and Rendering on Manifold Surface," retrieved at <<http://www.cse.ust.hk/~lihw/projects/pqe/paper.pdf>>, thesis, Hong Kong University of Science and Technology, Jul. 3, 2008, 32 pages.

Wei, Li-Yi, "Poisson Disk Maps," retrieved at <<http://research.microsoft.com/apps/pubs/default.aspx?id=80488>>, Microsoft Research Technical Report MSR-TR-2009-51, Microsoft Corporation, Redmond, WA, 2009, 8 pages.

Akenine-Moller, et al., "Stochastic Rasterization Using Time-Continuous Triangles," Proceedings of the 22nd ACM SIGGRAPH/EUROGRAPHICS Symposium on Graphics Hardware, 2007, retrieved at <<http://graphics.cs.lth.se/research/papers/2007/stochrast/stochrast2007.pdf>>, 11 pages.

Dammertz, et al., "Image Synthesis by Rank-1 Lattices," Monte Carlo and Quasi-Monte Carlo Methods 2006, Publisher Springer Berlin Heidelberg, 2008, retrieved at <<http://www.uni-ulm.de/fileadmin/website_uni_ulm/iui.inst.100/institut/mitarbeiter/sabrina/ImgSynthPrePrint.pdf>>, 19 pages.

Hormann, et al. "Mean Value Coordinates for Arbitrary Planar Polygons," ACM Transactions on Graphics, vol. 25, Issue 4, Oct. 2006, pp. 1424-1441, retrieved at <<http://folk.uio.no/michaelf/papers/barycentric.pdf>>, 18 pages.

Kopf, et al., "Recursive Wang Tiles for Real-Time Blue Noise," ACM Transactions on Graphics, Proceedings of SIGGRAPH 2006, vol. 25, Issue 3, 2006, retrieved at <<http://johanneskopf.de/publications/blue_noise/paper/Recursive_Wang_Tiles_For_Real-Time_Blue_Noise.pdf>>, 10 pages.

Lefebvre, et al., "Perfect Spatial Hashing," International Conference on Computer Graphics and Interactive Techniques, ACM SIGGRAPH 2006 Papers, 2006, pp. 579-588, retrieved at <<http://research.microsoft.com/en-us/um/people/hoppe/perfecthash.pdf>>, 10 pages.

Ostromoukhov, Victor, "Sampling with Polyominoes," ACM Transactions on Graphics, vol. 26, Issue 3, Jul. 2007, Proceedings of ACM SIGGRAPH 2007, Article No. 78, 2007, retrieved at <<http://www.iro.umontreal.ca/~ostrom/publications/pdf/SIGGRAPH07_SamplingWithPolyominoes.pdf>>, 6 pages.

Wei, Li-Yi, 2008, "Parallel Poisson Disk Sampling," ACM Transactions on Graphics, vol. 27, Issue 3, Aug. 2008, Proceedings of ACM SIGGRAPH 2008, Article No. 20, retrieved at <<http://research.microsoft.com/pubs/70563/tr-2008-46.pdf>>, 10 pages.

Jones, Thouis R., "Efficient Generation of Poisson-Disk Sampling Patterns," retrieved at <<http://people.csail.mit.edu/thouis/JonesPoissonPreprint.pdf>>, Journal of Graphics, 2006, vol. 11, No. 2, 10 pages.

Bikker, et al., "A Precalculated Point Set for Caching Shading Information," retrieved at http://igad.nhtv.nl/~bikker/files/pointset_PREPRINT.pdf, Proceedings of Eurographics 2009, Apr. 2009, 4 pages.

Qu, et al., "A Framework for Sample-Based Rendering with 0-Buffers," retrieved at http://www.cse.ust.hk/~huamin/qu_obuffer.pdf>>, Proceedings of the 14th IEEE Visualization, Oct. 2003, pp. 441-448.

Li, et al., "Dual Poisson-Disk Tiling: An Efficient Method for Distributing Features on Arbitrary Surfaces," retrieved at http://ieeexplore.ieee.org/stamp/stamp.jsp?arnumber=04479456>>, IEEE Transactions on Visualization and Computer Graphics, vol. 14, No. 5, Sep./Oct. 2008, pp. 982-998.

Li, Hongwei, "Texture Synthesis and Rendering on Manifold Surface," retrieved at http://www.cse.ust.hk/~lihw/projects/pqe/paper.pdf>>, thesis, Hong Kong University of Science and Technology, Jul. 3, 2008, 32 pages.

Wei, Li-Yi, "Poisson Disk Maps," retrieved at http://research.microsoft.com/apps/pubs/default.aspx?id=80488>>, Microsoft Research Technical Report MSR-TR-2009-51, Microsoft Corporation, Redmond, WA, 2009, 8 pages.

Akenine-Moller, et al., "Stochastic Rasterization Using Time-Continuous Triangles," Proceedings of the 22nd ACM SIGGRAPH/EUROGRAPHICS Symposium on Graphics Hardware, 2007, retrieved at <<http://graphics.cs.lth.se/ research/papers/2007/stochrast/stochrast2007.pdf>>, 11 pages.

Bridson, Robert, "Fast Poisson Disk Sampling in Arbitrary Dimensions," International Conference on Computer Graphics and Interactive Techniques, ACM SIGGRAPH 2007, Article No. 22, 2007, retrieved at <<http://www.cs.ubc.ca/~rbridson/docs/bridson-siggraph07-poissondisk.pdf>>, 1 page.

Cook, et al., "Stochastic Simplification of Aggregate Detail," ACM Transactions on Graphics, vol. 26, Issue 3, Jul. 2007, Proceedings of ACM SIGGRAPH 2007, Article No. 79, 2007, 8 pages.

Cook, Robert L., "Stochastic Sampling in Computer Graphics," ACM Transactions on Graphics, vol. 5, Issue 1, Jan. 1986, pp. 51-72.

Dammertz, et al., "Image Synthesis by Rank-1 Lattices," Monte Carlo and Quasi-Monte Carlo Methods 2006, Publisher Springer Berlin Heidelberg, 2008, retrieved at <<http://www.uni-ulm.de/fileadmin/website_uni_ulm/iui.inst.100/institut/mitarbeiter/sabrina/ImgSynthPrePrint.pdf>>, 19 pages.

Dunbar, et al., "A Spatial Data Structure for Fast Poisson-Disk Sample Generation," ACM Transactions on Graphics, vol. 25, Issue 3, Jul. 2006, Proceedings of ACM SIGGRAPH 2006, 2006, pp. 503-508, retrieved at <<http://www.cs.virginia.edu/~gfx/pubs/antimony/antimony.pdf>>, 6 pages.

Hachisuka, et al., "Multidimensional Adaptive Sampling and Reconstruction for Ray Tracing," ACM Transactions on Graphics, vol. 27, Issue 3, Aug. 2008, Proceedings of ACM SIGGRAPH 2008, Article No. 33, 2008, retrieved at <<http://graphics.ucsd.edu/~matthias/Papers/mdas.pdf>>, 10 pages.

Heckbert, Paul S., "Survey of Texture Mapping," IEEE Computer Graphics and Applications, Nov. 1986, pp. 56-67, retrieved at <<http://www.soe.ucsc.edu/classes/cmps160/Spring05/heckbert_texsurv.pdf>>, 14 pages.

Hormann, et al. "Mean Value Coordinates for Arbitrary Planar Polygons," ACM Transactions on Graphics, vol. 25, Issue 4, Oct. 2006, pp. 1424-1441, retrieved at <<hhttp://folk.uio.no/michaelf/papers/barycentric.pdf>>, 18 pages.

Kopf, et al., "Recursive Wang Tiles for Real-Time Blue Noise," ACM Transactions on Graphics, Proceedings of SIGGRAPH 2006, vol. 25, Issue 3, 2006, retrieved at <<http://johanneskopf.de/publications/blue_noise/paper/ Recursive_Wang_Tiles_For_Real-Time_Blue_Noise.pdf>>, 10 pages.

Lagae, et al., "A Comparison of Methods for Generating Poisson Disk Distributions," Computer Graphics Forum, vol. 27, No. 1, Mar. 2008, 15 pages.

Lefebvre, et al., "Perfect Spatial Hashing," International Conference on Computer Graphics and Interactive Techniques, ACM SIGGRAPH 2006 Papers, 2006, pp. 579-588, retrieved at <<http://research.microsoft.com/en-us/ um/people/hoppe/perfecthash.pdf>>, 10 pages.

McCool, et al., "Hierarchical Poisson Disk Sampling Distributions," Proceedings of the Conference on Graphics Interface'92, 1992, pp. 94-105, retrieved at <<http://www.dgp.toronto.edu/~elf/.misc/poissondisk.pdf>>, 12 pages.

Middleton, et al., Hexagonal Image Processing: A Practical Approach (Advances in Pattern Recognition), Springer-Verlag, New York, 2005, Springer book description provided only, retrieved at <<http://www.springer.com/computer/computer+imaging/book/978-1-85233-914-2>>, retrieved on Jul. 15, 2009, 1 page.

Ostromoukhov, Victor, "Sampling with Polyominoes," ACM Transactions on Graphics, vol. 26, Issue 3, Jul. 2007, Proceedings of ACM SIGGRAPH 2007, Article No. 78, 2007, retrieved at http://www.iro.umontreal.ca/~ostrom/ publications/pdf/SIGGRAPH07_SamplingWithPolyominoes.pdf>>, 6 pages.

Seiler, et al., "Larrabee: A Many-Core x86 Architecture for Visual Computing," ACM Transactions on Graphics, vol. 27, Issue 3, Aug. 2008, Proceedings of ACM SIGGRAPH 2008, Article No. 18, 15 pages.

Tzeng, et al., "Parallel White Noise Generation on a GPU via Cryptographic Hash," Proceedings of the 2008 Symposium on Interactive 3D Graphics and Games, 2008, pp. 79-87, retrieved at <<http://research.microsoft.com/pubs/70502/tr-2007-141.pdf>>, 9 pages.

Wei, Li-Yi, 2008, "Parallel Poisson Disk Sampling," ACM Transactions on Graphics, vol. 27, Issue 3, Aug. 2008, Proceedings of ACM SIGGRAPH 2008, Article No. 20, retrieved at <<http://research.microsoft.com/pubs/70563/ tr-2008-46.pdf>>, 10 pages.

White, et al., "Poisson Disk Point Sets by Hierarchical Dart Throwing," IEEE Symposium on Interactive Ray Tracing, pp. 129-132.

Zhang, X., et al., "Image Coding on Quincunx Lattice with Adaptive Lifting and Interpolation," Data Compression Conference, 2007, pp. 193-202, IEEE online abstract provided only, retrieved at <<http://ieeexplore.ieee.org/xpl/freeabs_all.jsp?tp=&arnumber=4148758&isnumber=4148732>>, 1 page.

Rivest, R.; "RFC 1321: The MD5 Message-Digest Algorithm"; Network Working Group; Apr. 1992; 20 pages.

* cited by examiner $Z = 4$

- UNUSED INITIAL SAMPLES
- ☆ TRUE POISSON DISK SAMPLES, $\hat{r} = 1$
- △ POISON DISK SAMPLES WITH REDUCED $\hat{r}$
- ○ JITTERED-FILLED REMAINING SAMPLES

POISSON DISK SAMPLE MAPS

BACKGROUND

A sample map corresponds to a collection of sample values arranged according to a defined structure. For example, a texture map may provide a collection color data values. A graphics application (such as a game application, etc.) can create a texture image on the basis of the texture map, e.g., by performing texture filtering on color data values obtained from the texture map.

Traditional sample maps store sample values in a grid having a regular pattern. FIG. 1 shows one such regular sample map. These types of maps are prone to aliasing. Aliasing negatively affects the visual appearance of images that are created on the basis of the sample maps. Accordingly, the industry has devoted significant effort to reduce the amount of aliasing associated with sample maps.

The aliasing problem can be addressed by using alternative lattice patterns, such as a quincunx pattern, a hexagonal pattern, a rank-1 pattern, etc. These alternative patterns may shift artifacts away from the vertical and horizontal directions towards other less visually conspicuous orientations. Yet these alternative patterns are still vulnerable to aliasing due to their use of underlying regular structures.

SUMMARY

According to one illustrative implementation, a map encoding module is described for creating a sample map in which sample values are placed within respective cells of an organizing grid structure, as governed, in part, by a Poisson disk distribution. In this process, a Poisson disk selection algorithm selects the locations for the sample values from a candidate set of possible locations, first with a normalized radius value of $\hat{r}=1$ and then with successive iterations of $\hat{r}<1$. A default algorithm fills in remaining sample values in a jittered fashion. The map encoding module represents the locations of the sample values using respective integer values.

A location determination module can determine a location of a sample value within a particular cell using a decoding algorithm. The decoding algorithm receives selection information, including: cell location information which identifies a particular cell within the sample map; an integer value associated with the location of the sample value within the particular cell; and a global key value. The decoding algorithm uses a cryptographic hashing algorithm to transform the selection information into location information which identifies the location of the sample value within the particular cell. The map encoding module complements the location determination module by using the same decoding algorithm to generate candidate locations based on integer values.

Various graphics applications can use the map encoding module and the location determination module to reduce aliasing in displayed images. This is because the Poisson distribution of sample values in the sample map effectively replaces low frequency aliasing with high frequency noise, which corresponds to a visually less annoying artifact. The sample map is also efficient because it represents stochastic locations within the sample map without incurring a large storage overhead. For example, in one case, each of the integer values is specified by only two or three bits. The sample map also readily accommodates random access techniques because it stores single sample values in the cells of a regular organizing structure.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 also illustrates how sample values can be extracted from the sample map.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for generating a Poisson disk sample map. The disclosure also sets forth an approach for retrieving sample values from such a sample map. The disclosure also describes the characteristics of the sample map itself.

This disclosure is organized as follows. Section A describes illustrative systems for performing the above-summarized functions. Section B describes illustrative methods which explain the operation of the systems of Section A. Section C describes illustrative processing functionality that can be used to implement any aspect of the features described in Sections A and B.

Figure 15:
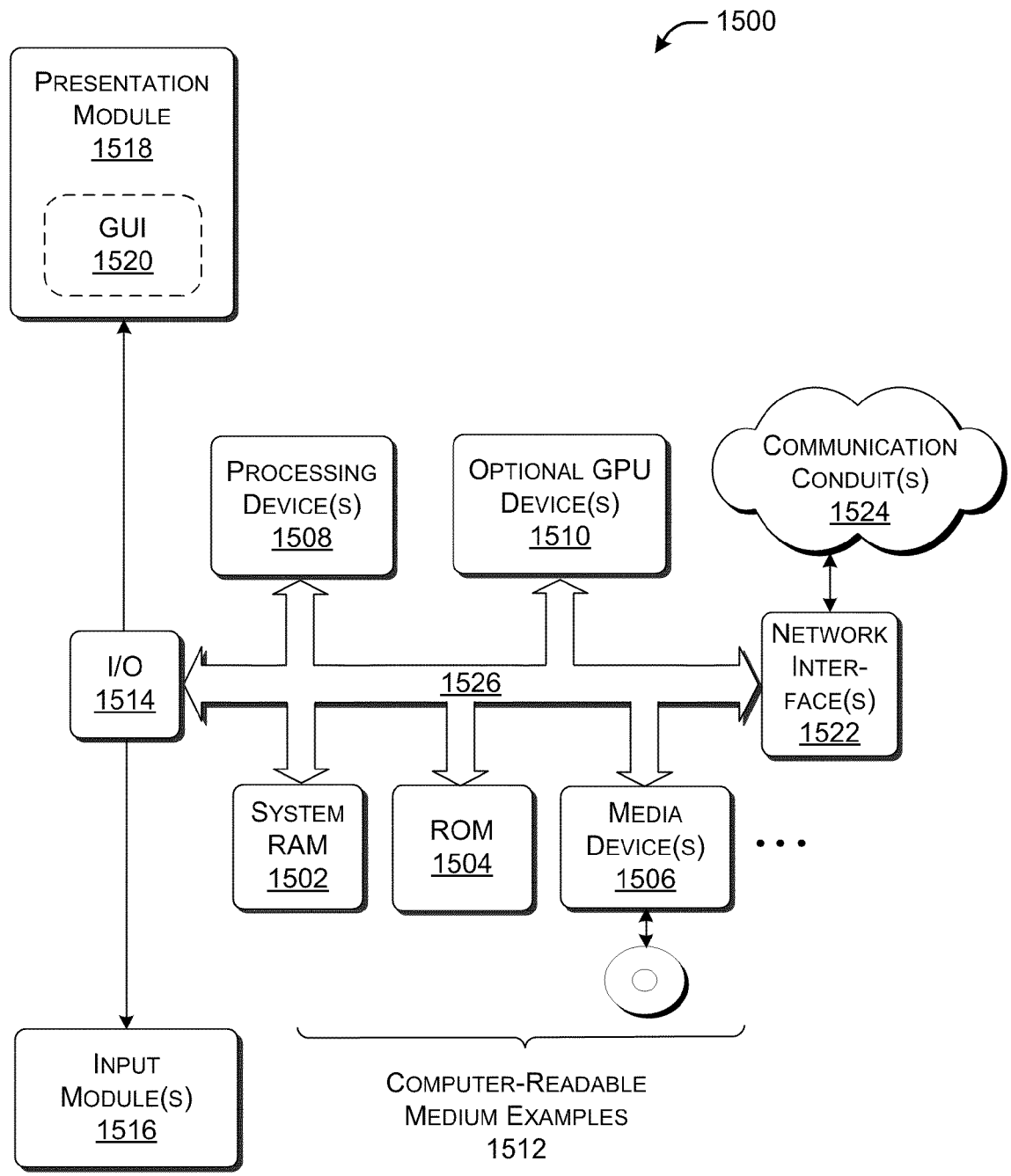
FIG. 15 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 15, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative Systems

A.1. Introductory Overview of a Sample Map

Figure 2:
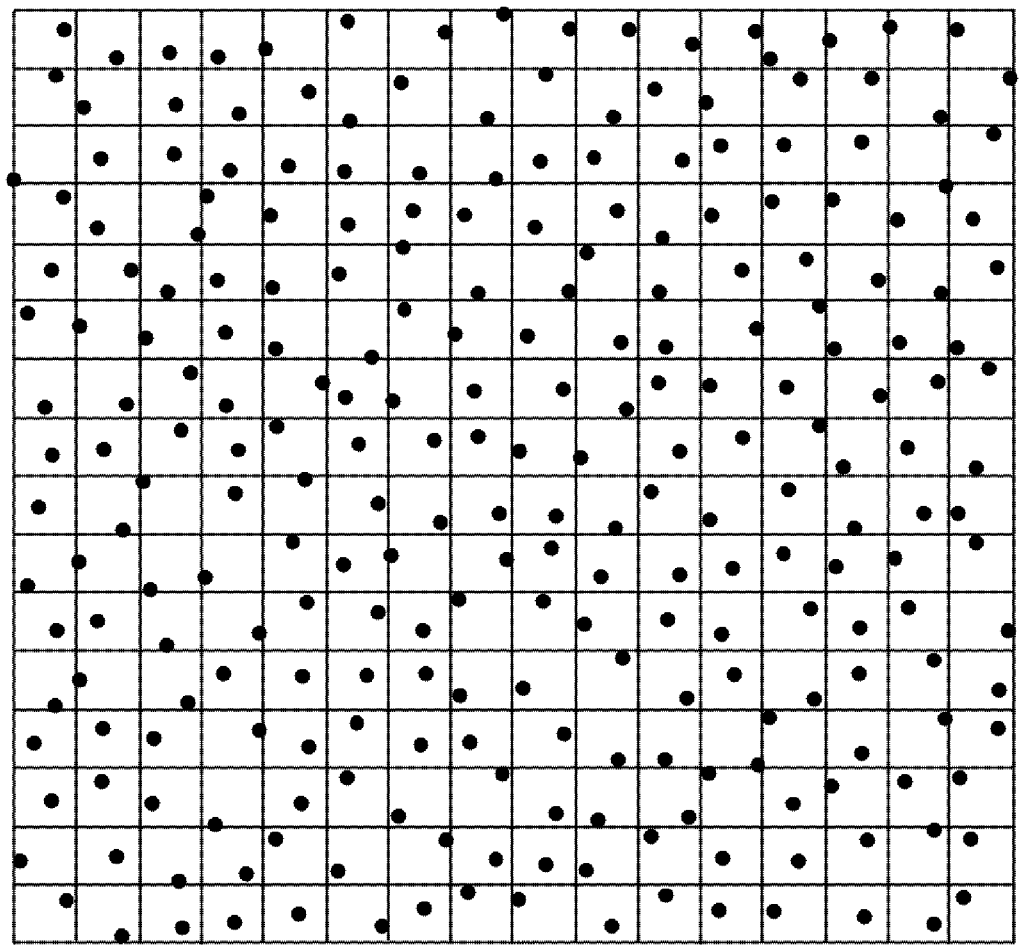
FIG. 2 shows an illustrative sample map having at least a subset of sample values arranged according to a Poisson disk distribution.

First consider an illustrative sample map produced by the functionality described herein, as shown in FIG. 2. A sample map refers to an organizing structure that contains or references sample values. Sample values, in turn, correspond to any type of data values. In the case of image information, for instance, the sample values may represent RGBA data values. A graphics application can present an image on an electronic display on the basis of the sample values within the sample map.

In the case of FIG. 2, the black dots represent the locations at which the samples values are placed in accordance with the organizing structure. Hence, the black dots can also be said represent the actual sample values. For this reason, the following explanation will sometimes refer to the symbols (e.g., the black dots) in a sample map as representing locations, and other times as representing the actual sample values. In general, any reference to sample values stored by a sample map is to be construed as broadly encompassing any mechanism for arranging the sample values in accordance with an organizing structure. For instance, in one physical implementation of the sample map, the locations of the data samples can be represented using a first array of location values; the actual sample values (e.g., the actual RGBA color values) can be represented using a second array of data values that is related to the first array.

In FIG. 2, the organizing structure corresponds to a regular pattern defined by horizontal and vertical grid lines. This organizing structure defines a plurality of rectangular cells. However, the functionality described herein can produce sample maps defined by other organizing structures having cells with different shapes. To cite one example, the functionality can produce a sample map having a hexagonal organizing structure that includes hexagonal cells.

The functionality described herein arranges at least a subset of sample values within a sample map using a Poisson disk selection algorithm, resulting in an irregular distribution of sample values. In a Poisson disk distribution, the sample values are generally arranged in a random (stochastic) fashion, but the sample values are constrained such that each sample value is separated from all of its neighboring sample values by a prescribed radius r. The functionality described herein also places the sample values within the sample map such that each cell within the organizing structure includes only one sample.

Figure 3:
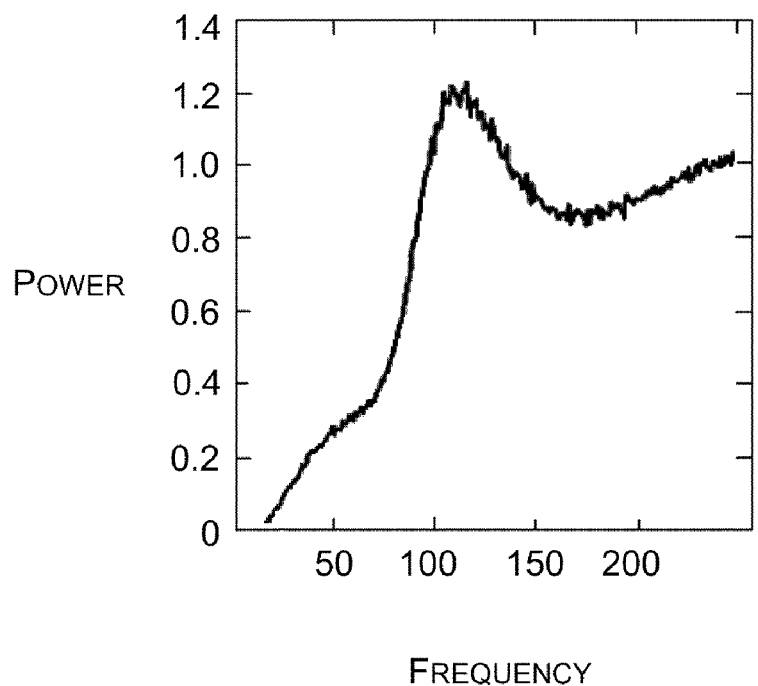
FIG. 3 shows the characteristics of the sample map of FIG. 2 using a radial mean plot.
Figure 4:
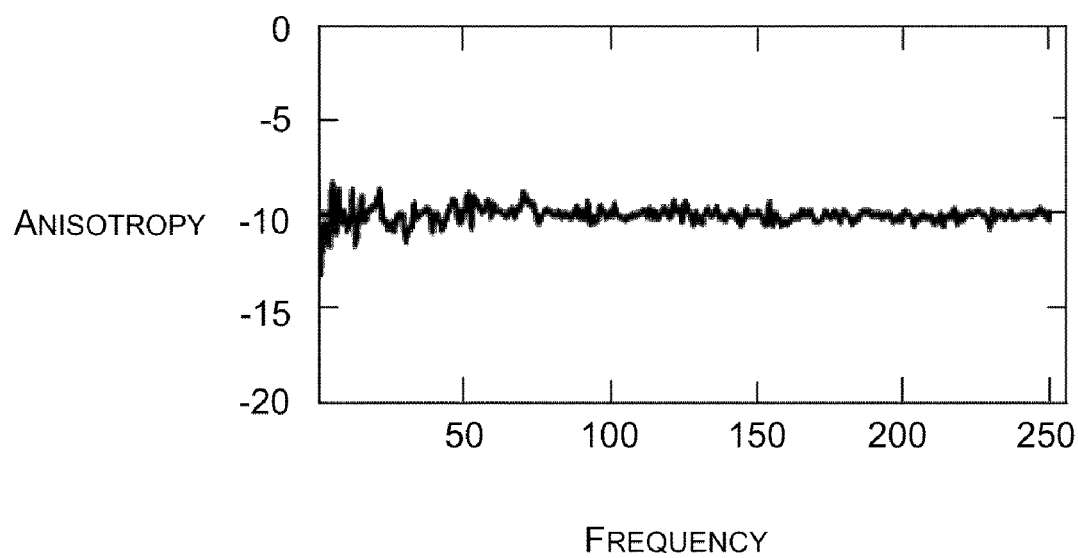
FIG. 4 shows the characteristics of the sample map of FIG. 2 using an anisotropy plot.

The distribution of the sample values within the sample map of FIG. 2 exhibits desirable blue noise properties. A blue noise spectrum effectively replaces low frequency aliasing with high frequency noise, which correspond to a visually less annoying artifact. More formally, FIG. 3 shows a plot which represents the radial mean characteristics of the sample map of FIG. 2, while FIG. 4 shows a plot which represents the anisotropy characteristics of the sample map of FIG. 2. These plots exhibit reduced aliasing compared to, for instance, the characteristics associated with the regular pattern shown in FIG. 1. Radial mean plots and anisotropy plots are types of graphs well understood in the art; a discussion of such graphs can be found in Lagae et al., "A Comparison of Methods for Generating Poisson Disk Distributions," *Computer Graphics Forum*, Vol. 27, No. 1., 2008, pp. 114-129.

Figure 1:
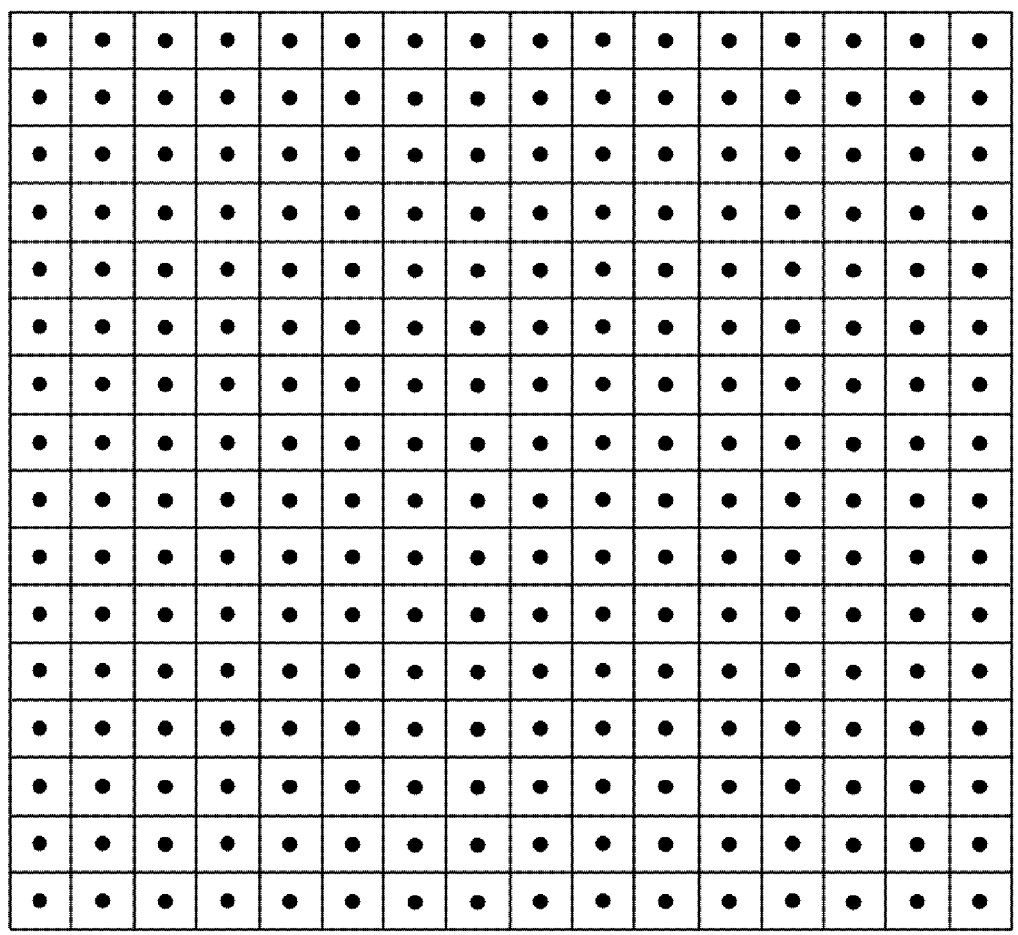
FIG. 1 shows a sample map having sample values arranged according to a regular pattern.

The sample map of FIG. 2 offers improved aliasing-related performance compared to the sample map of FIG. 1, but it otherwise provides some of the same benefits as traditional sample maps. Namely, the sample map of FIG. 2 stores a single sample value in each of the plurality of cells of the organizing structure. This means that retrieval functionality can use random access techniques to access sample values within the sample map, which in turn, can accommodate the use of less complex processing hardware that can quickly generate images on the basis of the sample map. In this sense, the Poisson disk sample map complements the regularized storage of sample values, rather than entirely replacing such an approach.

The following explanation provides additional details regarding illustrative functionality that can be used to create and utilize the type of sample map shown in FIG. 2. More specifically, Section A.2 describes functionality for creating the type of sample map shown in FIG. 2. Section A.3 describes functionality for retrieving samples values from the type of sample map shown in FIG. 2. And Section A.4 describes representative applications of the functionality described in Sections A.2 and A.3.

A.2. Illustrative Map Encoding Module (MEM)

Figure 5:
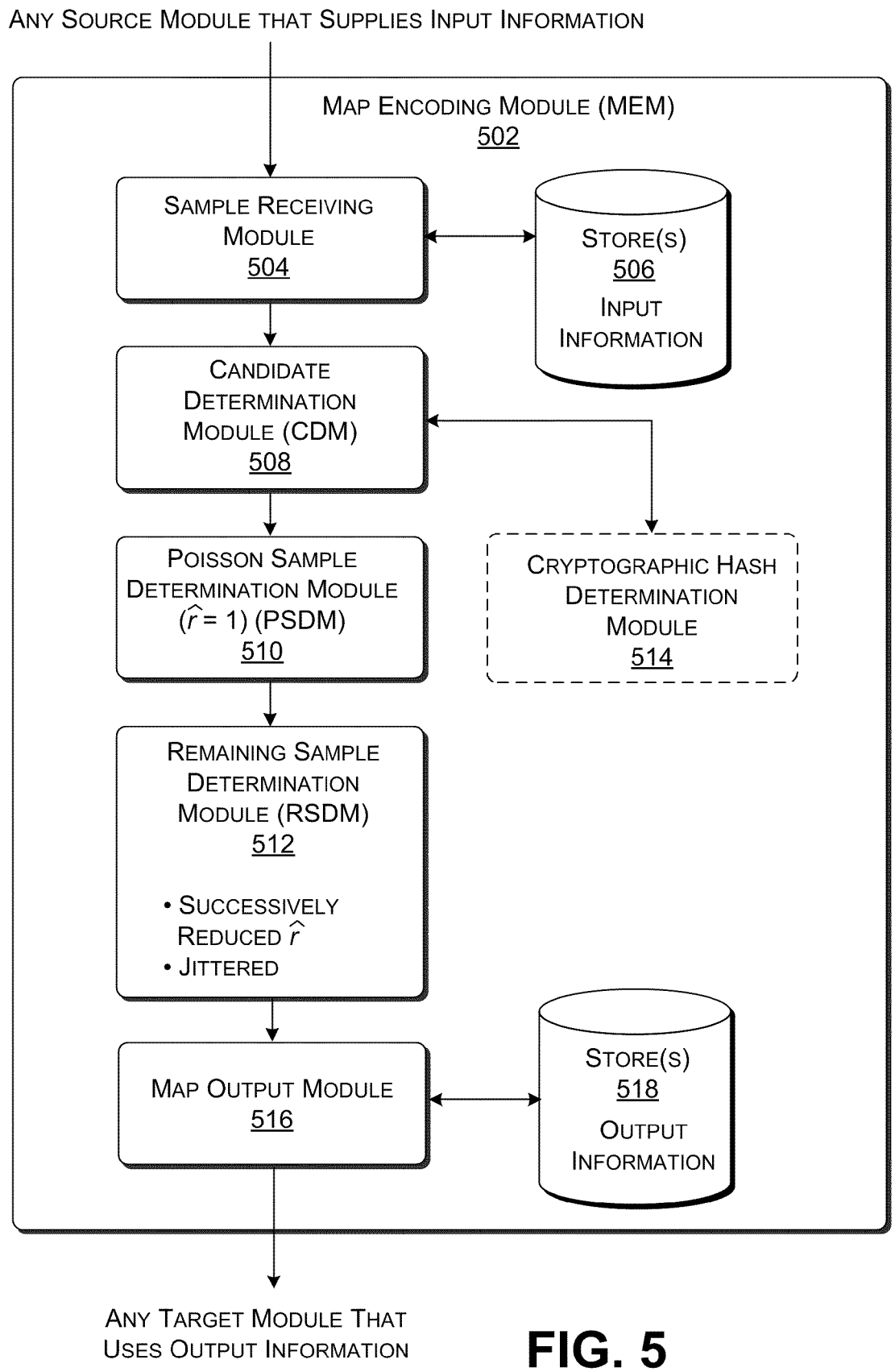
FIG. 5 shows an illustrative map encoding module for producing the sample map shown in FIG. 2.
Figure 6:
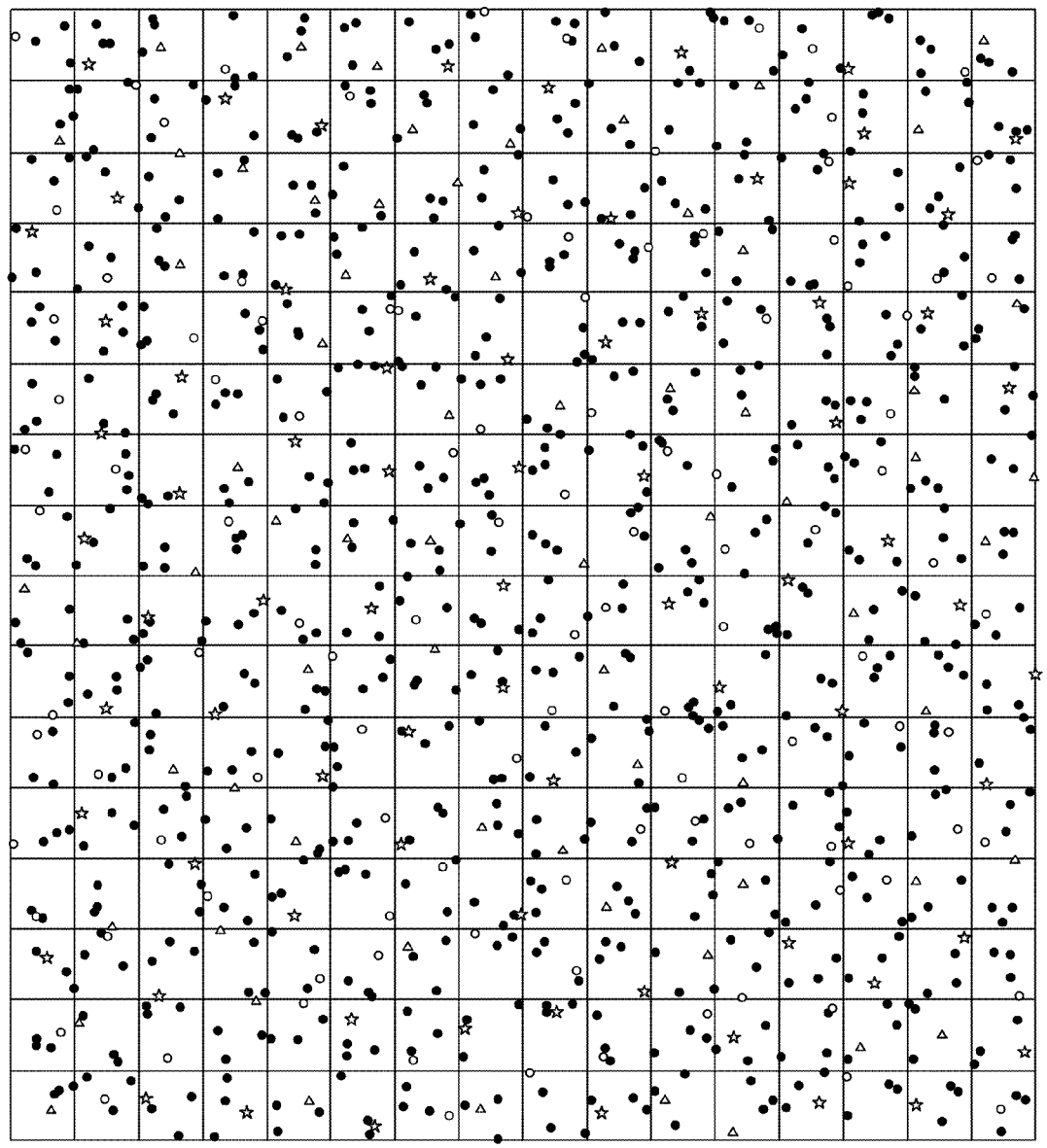
FIG. 6 shows another illustrative sample map; here, the sample map is annotated with information which indicates the origin of sample values in the sample map.

FIG. 5 shows an illustrative map encoding module (MEM) 502 that includes, or can be conceptualized to include, a number of component modules. These component modules will be explained below in conjunction with FIG. 6. FIG. 6 shows an illustrative sample map which is annotated with different symbols that represent the locations of sample values. More specifically, as will be explained, different modules of the MEM 502 can play a role in defining sample values within a sample map; the different symbols in FIG. 6 identify the respective modules by which the sample values are established.

A sample receiving module 504 receives any type of input information from which it constructs a sample map. The input information includes a plurality of initial sample values. For example, the input information may correspond to image information which provides a plurality of RGBA sample values. In one case, the input information includes an initial sample map, such an the type of sample map illustrated in FIG. 1 that arranges sample values according to a regular grid pattern. In this scenario, the task of the MEM 502 is to distribute the sample values in this sample map to produce an output sample map of the type shown in FIG. 2. The sample receiving module 504 can optionally store any input information that it receives in one or more stores 506.

A next series of modules performs the task of selecting the locations at which sample values are to be provided within the output sample map (referred to as simply a "sample map" for brevity below). A first such module is a candidate determination module (CDM) 508. The CDM 508 selects a plurality Z of candidate locations for each cell. A Poisson sample determination module (PSDM) 510 and a remaining sample determination module (RSDM) 512 together perform the task of choosing among the candidate locations identified by the CDM 508. That is, the PSDM 510 and the RSDM 512 select one of the Z candidate locations per cell. These selections determine the placement of sample values within the sample map.

More specifically, the CDM 508 provides the candidate locations by first defining a plurality Z of integer values per cell, namely, $k_0, k_1, k_2, \ldots k_{Z-1}$. For example, in one case, the CDM 508 defines four integer values per cell. In another case, the CDM 508 defines eight integer values per cell. The number of integer values defines the granularity at which the MEM 502 determines the locations of the sample values. There is no limitation regarding how many integer values can be used per cell.

The CDM 508 uses a decoding algorithm to map each of the integer values to specific locations within the sample map. As will be described below in Section A.3, the same decoding algorithm is used to retrieve sample values from an already created sample map. Generally, the decoding algorithm operates by accepting selection information which characterizes a location in the sample map. The decoding algorithm transforms the selection information into location information which describes the actual location of a sample value within the sample map, e.g., using x and y coordinates or some other representation of position.

Without limitation, one decoding algorithm that can be used is described by the following sequence of operations:

$$id = k \mathbin{<<} b(t_x) + b(t_y) \text{ or } t_x \mathbin{<<} b(t_y) \text{ or } t_y$$

$$x_{O1} = H(K \text{ xor } id)$$

$$y_{O1} = H(x_{O1})$$

$$x = x_{O1} \times v$$

$$y = y_{O1} \times v \qquad (1).$$

In this approach, $t_x$ and $t_y$ represent the texel coordinates of a particular cell in the sample map. The symbol k represents an integer value associated with a particular candidate location within the particular cell. The symbol $\ll$ represents a shift-left operation; for example, the expression $t_x \mathbin{<<} b(t_y)$ indicates that the value $t_x$ is to be shifted left by $b(t_y)$ positions. The symbol or presents a logical OR operation and the symbol xor represents a logical XOR operation. The symbol $b(\ldots)$ expresses a number of bits; for example, the expression $b(t_x)$ represents the number of bits in the value $t_x$. The symbol K represents a global key value which applies to the entire sample map. The symbols $x_{O1}$ and $y_{O1}$ refer to random numbers (e.g., in the range between 0 and 1) produced by a cryptographic hashing algorithm (represented by the symbol $H(\ldots)$). The symbol v represents a scaling factor, which, in some scenarios, may correspond to the size of a cell in the sample map, such as the length of the side of a rectangular cell. Finally, x and y represent the actual location of a sample value within the particular cell; for example, x and y can refer to the offset of the sample value within a cell, as measured from a reference corner of the cell.

For example, assume that the CDM 508 defines four integer values, $k_0, k_1, k_2,$ and $k_3$ for a particular cell within the sample map, located at particular texel coordinates $t_x$ and $t_y$. The CDM runs the decoding algorithm (associated with Equation (1)) for each of the integer values, along with the other pieces of the selection information (namely, $t_x, t_y,$ and K). This operation produces four actual candidate locations within the particular cell, namely $(x_{can0}, y_{can0}), (x_{can1}, y_{can1}), (x_{can2}, y_{can2}),$ and $(x_{can3}, y_{can3})$. The CDM 508 repeats this operation for all cells in the sample map to produce a complete set of location possibilities M.

The PSDM 510 and the RSDM 512 select one of the candidate locations per cell, which implicitly entails selecting one of the k values per cell. For example, for the particular cell described above, suppose that the PSDM 510 or the RSDM 512 selects the location $(x_{can2}, y_{can2})$ at which to place the sample value. This location is associated with the integer value $k_2$. This means that the integer value $k_2$ can serve as a shorthand reference to represent the actual location, i.e., $(x_{can2}, y_{can2})$. In fact, the decoding algorithm represented by Equation (1) can use the integer value $k_2$ to later reconstruct the actual location $(x_{can2}, y_{can2})$. In general terms, the PSDM 510 and the RSDM 512 perform a discrete optimization operation with respect to M number of states (associated with the total number of candidate location possibilities); this optimization operation attempts to produce a final sample map that exhibit as close to a Poisson disk sample distribution as possible.

The sample map shown in FIG. 6 further clarifies the operations performed by the CDM 508, PSDM 510, and RSDM 512. In this representative and non-limiting case, the CDM 508 operates by defining four candidate locations in each cell. FIG. 6 represents these four candidate locations as black dots. Initially, there are four black dots in each cell. For each cell, the PSDM 510 and the RSDM operate to select one of these four black dots as a location at which to place a sample value in that cell. FIG. 6 represents such a selection by replacing one of the black dots per cell with another symbol (where the significance of the different types of symbols shown in FIG. 6 will be explained below). Hence, the remaining black dots in FIG. 6 represent candidate locations that have not been selected. In the final sample map, these candidate locations are effectively removed; they are shown in FIG. 6 to help the reader understand the progression of the operations performed by the MEM 502.

Returning to FIG. 5, the decoding algorithm can use any type of random number generator to produce the $(x_{O1}, y_{O1})$ values. In one example, the decoding algorithm can use a cryptographic hash determination module 514 to perform this function. In other words, the CDM 508 module calls on the cryptographic hash determination module 514 to execute the hashing operations (H( . . . )) used in Equation (1).

In one case, the MEM 502 can use the well known MD5 algorithm (Message-Digest algorithm 5) to implement the cryptographic hash determination module 514. The MD5 algorithm is described in Ronald L. Rivest, RFC 1321: The MD5 Message-Digest Algorithm, Network Working Group, 1992. In one implementation, the MEM 502 can use an implementation of the MD5 algorithm described in Tzeng, et al., "Parallel White Noise Generation on a GPU via Cryptographic Hash," *Proceedings of the* 2008 *Symposium on Interactive* 3D *Graphics and Games,* 2008, pp. 79-87. For example, to expedite processing, the MEM 502 can implement the cryptographic hash determination module 514 using a pixel shader hardware provided by one or more graphics processing units (GPUs). Further acceleration can be achieved by implementing selected decoding operations without caching, with weighting that accommodates one-clock filtering, and so on.

The global key value K is a global constant for the entire sample map. In one example, the global key value K is 32 bits long. The global key value can be chosen in an arbitrary fashion because it generally does not have a predictable effect on the quality of the output results. Certain key values K may in fact impact the quality of the results, e.g., by producing samples with higher non-uniformity, causing corresponding local regions to have poorer sampling quality. In one approach, the MEM 502 can try a plurality of different global key values K during the generation process and select the one that provides suitable quality.

For large sample maps, the number of bits in $b(t_x)$ and $b(t_y)$ may cause an overflow in the computation of the id value of Equation (1). The CDM 508 can resolve this issue by using the alternative id formula:

$$id = k \, \text{xor} \, H(t_x \, \text{xor} \, H(t_y)) \quad (2)$$

The variables and symbols in this equation are explained above with reference to Equation (1). Equation (2) is computationally more "expensive" than the id formula in Equation (1), e.g., because it involves two hashing operations.

Advancing to a discussion of the PSDM 510, this module selects a first subset of locations from the entire set of candidate locations M defined by the CDM 508. The PSDM 510 uses a Poisson selection algorithm to choose among the candidate locations. Generally, Poisson selection algorithms are governed by a radius value, defining the minimum permitted distance between any sample value and its neighboring sample values. In the particular case of FIG. 5, the PSDM 510 selects a radius value $r=r_{max}$ defined as follows:

$$r_{max} = \mu \sqrt[n]{n} \quad (3)$$

Here, $\mu$ describes the cell size and n describes the dimension of the sample map, e.g., 2 in the case of FIG. 6. This radius value $r_{max}$ will produce, at most, one sample per grid cell. The radius value can also be expressed as a normalized radius value $\hat{r}$, as follows:

$$\hat{r} = \frac{r}{r_{max}} \quad (4)$$

Here, r corresponds to an actual radius value, and $r_{max}$ corresponds to the maximum radius value which meets the criteria described above. The PSDM 510 operates with $r=r_{max}$, and therefore $\hat{r}=1$.

The PSDM 510 can use any Poisson selection algorithm to select locations at which to place the candidate values. In one representative case, the PSDM 510 can use the well known dart throwing algorithm to implement this function, e.g., as described in Robert L. Cook, "Stochastic Sampling in Computer Graphics," *ACM Transactions on Graphics,* Vol. 5, Issue 1, 1986, pp. 51-72. In a traditional dart throwing approach, a sample s is uniformly and randomly drawn from a sampling domain and added to an existing sample set if s is at least r distance away from all existing samples. This process is repeated until enough samples are obtained or a maximum iteration or time limit is reached. In the present approach, the PSDM 510 draws sample locations from a discrete set of sample locations M defined by the CDM 508, as opposed to a continuous sampling domain.

FIG. 6 illustrates the outcome of the operation of the PSDM 510. More specifically, the PSDM 610 selects a first subset of locations from the possible set of locations M. FIG. 6 represents this first subset of locations using a star symbol. That is, in a cell that includes a star symbol, the star symbol effectively replaces an underlying black dot symbol, indicating that the PSDM 610 has selected that candidate location at which to place a sample value. The locations denoted by the star symbol exhibit a Poisson distribution in that no sample value is less than $r=r_{max}$ distance from any of its neighboring sample values. Further, the value of $r_{max}$ is selected such that each cell contains at most one sample.

Note, however, that not every cell includes a star symbol. In fact, the operation of the PSDM 510 leaves most of the cells empty, e.g., approximately 69.3% empty. Here, a cell is considered empty if the PSDM 510 does not resolve the location of the sample value within that cell, meaning that the PSDM 510 does not choose among the four candidate locations within that cell.

At this stage, the RSDM 512 comes into play by resolving sample locations for the remaining empty cells. The RSDM 512 operates in two phases. In a first phase, the RSDM 512 uses the above-described Poisson disk selection algorithm to resolve additional sample locations. In this case, however, the RSDM 512 relaxes the placement criteria described above by reducing the normalized radius value, e.g., such that $\hat{r}=\hat{r}-\Delta_r$. In one representative and non-limiting case, $\Delta_r=0.01$. For example, in a first iteration, the RSDM 512 reduces $\hat{r}$ by 0.01 to yield a normalized radius value of 0.99. The RSDM 512 runs the dart throwing algorithm described above with this reduced normalized radius value $\hat{r}$. As a result, the RSDM 512 may resolve the locations for additional cells within the sample map. Yet this operation may leave other cells still unresolved. To address the unresolved cells, the RSDM 512 repeats the above-described process a plurality of times with successively smaller normalized radius values. That is, after each iteration, the RSDM 512 reduces the normalized radius value by the prescribed amount, e.g., $\hat{r}=\hat{r}-\Delta_r$.

The RSDM 512 terminates the above-described process when it reaches a terminal radius value $r_{stop}$. This is the value at which it can be empirically observed that the quality of the resultant sample map begins to deteriorate. For example, an anisotropy plot can reveal the value at which a marked deterioration in quality occurs; for example, such deterioration may manifest itself in a spike in the level of anisotropy. According to one illustrative implementation, the RSDM 512 terminates the above-described process when $\hat{r}$ equals approximately 0.60 to 0.70, such as approximately 0.66 (although other ranges and values can be used). In practice, environment-specific factors may have an influence on the terminal radius value $r_{stop}$ that is deemed appropriate for a particular environment. However, it is observed that the value of $r_{stop}=0.66$ exhibits general applicability to many different environments.

When the radius value reaches the terminal value $r_{stop}$, the RSDM 512 will have selected, over several iterations, a second subset of candidate locations within the sample map. FIG. 6 represents the candidate locations that have been selected by the Poisson disk selection algorithm using $\hat{r}<1$ with a triangle symbol. In each cell that includes a triangle symbol, the triangle symbol replaces one of the four black dots.

Note, however, that the process of successively reducing the normalized radius value still leaves some cells empty (that is, unresolved). To address this issue, the RSDM 512 invokes a second phase of its operation. In this phase, the RSDM 512 fills in the remaining empty cells using a default algorithm. For example, the RSDM 512 can using a jittering approach to select sample values for the remaining cells. In a jittering approach, the RSDM 512 selects a random location within a cell to place the sample value. Again, however, the RSDM 512 is constrained to select from among the four available candidate locations. This means that the RSDM 512 can arbitrarily select one of the four available candidate locations. FIG. 6 represents the candidate locations that have been selected by the default algorithm with dots having white centers.

At this point, the MEM 502 has finished its operation by ensuring that each cell in the sample map includes at least one sample value, selected from among the Z possible candidate locations (e.g., 4, 8, etc.). In summary, the final sample map includes a first subset of sample values located at a first subset of locations, as chosen by the Poisson selection algorithm for the case of $\hat{r}=1$ (represented by the star symbols). The final sample map includes a second subset of sample values located at a second subset of locations, as chosen by the Poisson selection algorithm for the case in which $\hat{r}<1$ (represented by the triangle symbols). Finally, the final sample map includes a third subset of sample values located at a third subset of jittered locations, as chosen by a default algorithm (represented by the dot symbols having white centers).

A map output module 516 outputs the resultant sample map for use by any target application. The MEM 502 may also provide one or more stores 518 for storing any output information generated by the MEM 502, including the resultant sample map.

Figure 7:
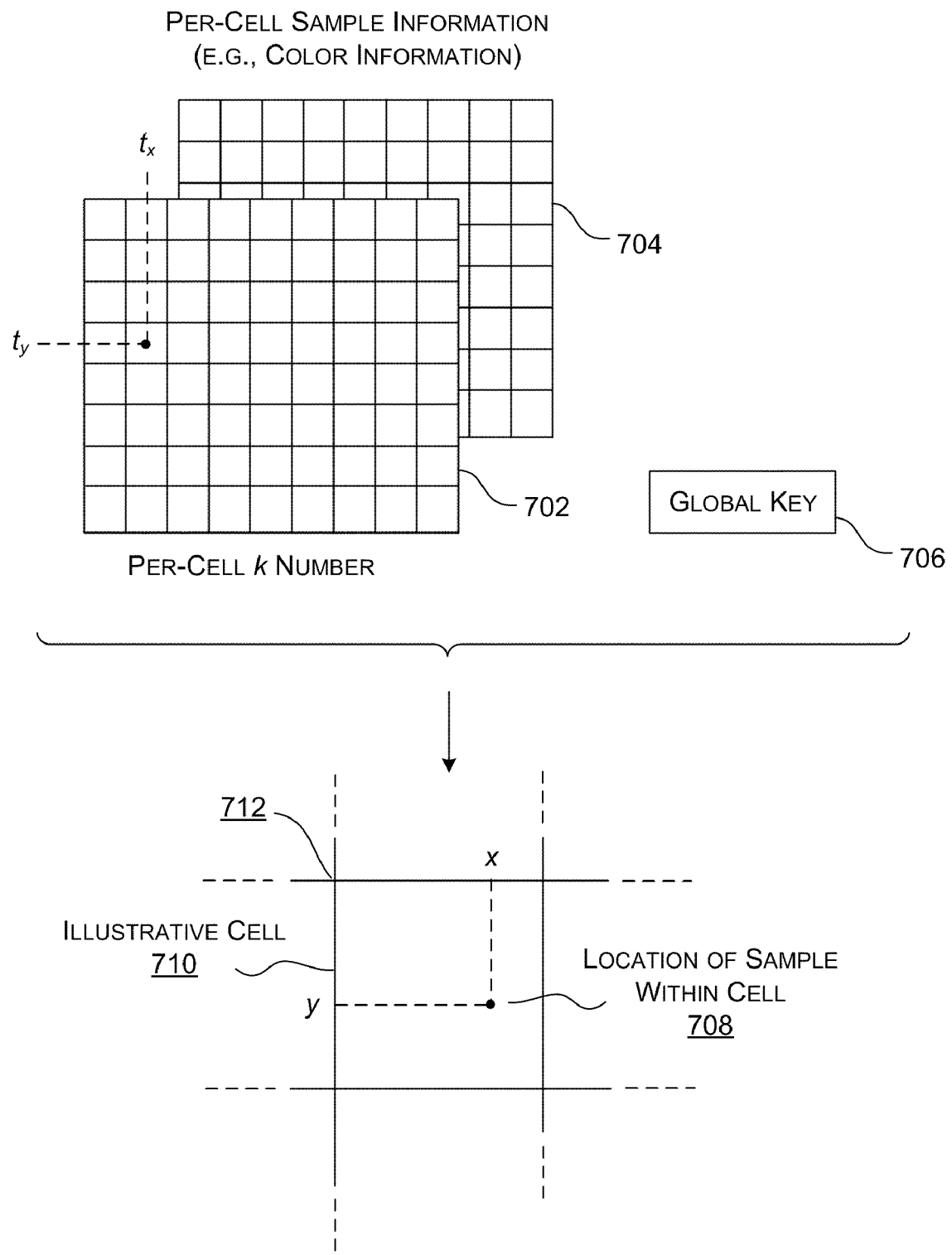
FIG. 7 shows illustrative output information that is produced by the map encoding module of FIG. 3 to represent the sample map.

FIG. 7 represents output information that can be generated by the MEM 502 of FIG. 5. The output information can include a first array of information 702 which represents the k values selected by the MEM 502. As explained above, the k values can be decoded to provide the actual locations of sample values within the sample map. The output information can also include a second array of information 704 which is correlated with the first array of information 702. The second array of information 704 provides the actual sample values associated with the locations identified in the first array of information 702. For example, for the case in which the sample map represents an image, the sample values can corresponds to RGBA color values. Finally, the output information can include a per-map global key value 706.

The output information illustrated in FIG. 7 represents an efficient way to describe the sample map. This is because the k values represent relatively small integer values. For example, in one scenario, the MEM 502 can produce integer values having only two or three bits (although larger k values can also be used). This is in contrast to an attempt to directly record the locations of sample values within the cells, e.g., using a high precision floating point representation. This alternative would incur a much greater storage cost. The global key applies to the entire sample map, and therefore does not represent a significant extra storage overhead.

Moreover, as stated above, the sample map can be queried using a random access approach. This is because the sample values are placed within a regular grid or other type of regular organizing structure; further, each cell includes a single sample value. The next section will provide additional detail regarding one technique for retrieving sample values from a sample map created by the MEM 502 of FIG. 5.

A.3. Illustrative Location Determination Module (LDM)

Figure 8:
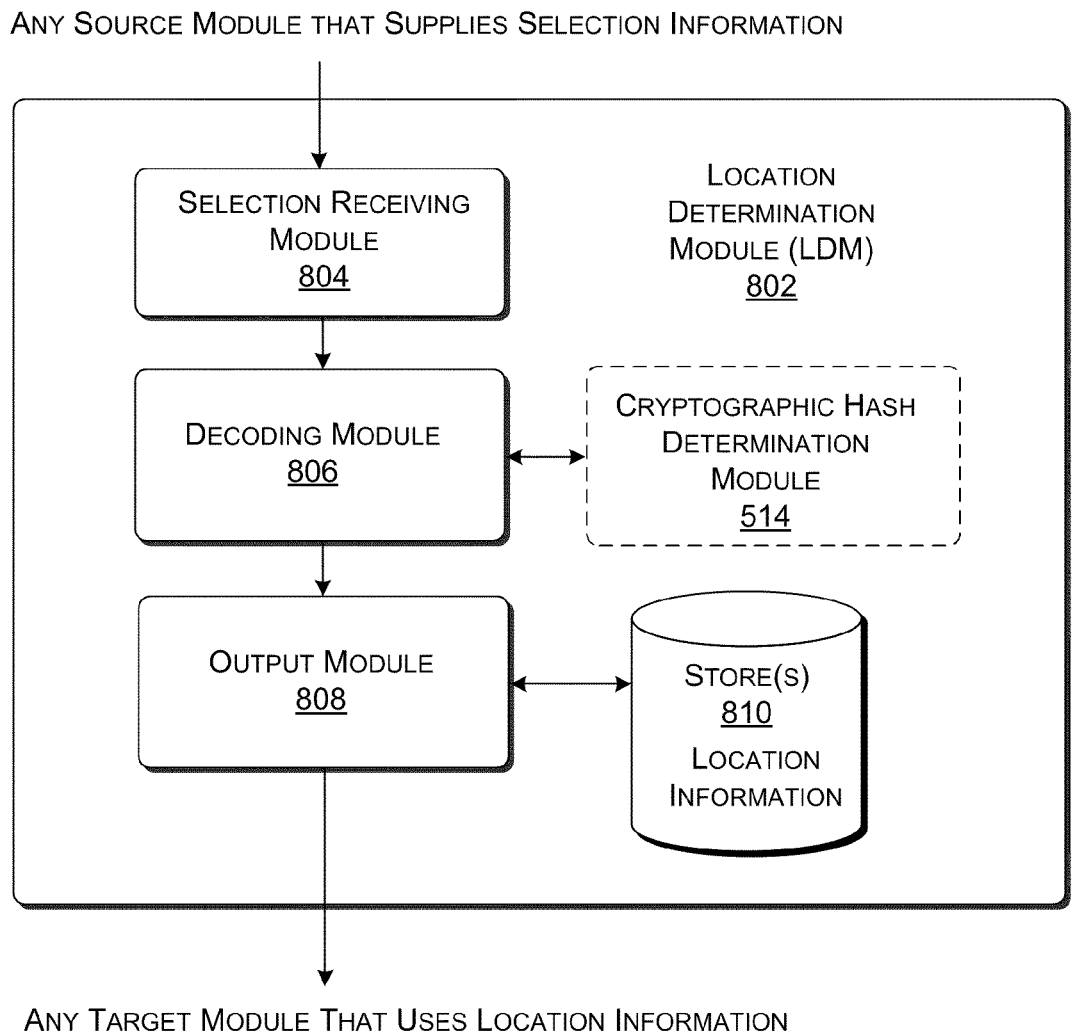
FIG. 8 shows an illustrative location determination module for identifying a location of a sample value within a sample map produced by the map encoding module of FIG. 3.

FIG. 8 shows an illustrative location determination module (LDM) 802 for retrieving sample values from a sample map. The LDM 802 can include, or can be conceptualized to include, plural component modules.

One such component module is a selection receiving module 804. The selection receiving module 804 receives selection information which specifies a location within the sample map. The selection information can include the texel coordinates associated with a particular cell in the map, e.g., $t_x$ and $t_y$. The selection information can also include a k value associated with the particular cell. The selection information can also include the global per-map K key value.

A decoding module 806 supplies the selection information as input to the decoding algorithm described above in Section A.2, e.g., as defined by Equation (1). The decoding algorithm transforms the selection information into location information. The location information specifies the actual coordinates of a sample value within the sample map. For example, as shown in FIG. 7, the decoding algorithm can generate x and y values which determine an x/y offset location 708 within a particular cell 710, as measured from a reference corner 712 of the particular cell 710. Other implementations may use other referencing mechanisms to identify the location of a sample value. Although not shown, the LDM 802 can retrieve the actual sample value (e.g., color value) associated with the cell 710 in conventional fashion.

Returning to FIG. 8, the decoding module 806 can interact with the cryptographic hash determination module 514 to perform the hashing operations within Equation (1) (and within Equation (2), if this equation is also used). As stated, the cryptographic hash determination module 514 can use any type of algorithm for generating random values, such as the MD5 algorithm. As stated, the cryptographic hash determination module 514 can optionally be implemented by hardware provided by a graphics processing unit (GPU), such as a pixel shader of a graphics pipeline.

An output module 808 outputs the location information to any consuming target application. The LDM 802 can also optionally store the location information in one or more stores 810.

To simplify explanation, the above explanation described the operation of the LDM 802 in terms of the determination of a single location within a sample map. However, the LDM 802 can more generally be applied to determine a plurality of locations within the sample map. The determination of the plural locations can proceed in series and/or in parallel.

The approach described above for creating and accessing a sample map can be modified in various ways. For example, the MEM 502 can take different approaches when the radius value reaches the terminal radius value, e.g., 0.66. In an alternative case, upon reaching the terminal radius value, the MEM 502 can continue to perform a Poisson disk selection technique to fill in the remaining cells. For example, the MEM 502 can start another independent Poisson disk selection operation after $\hat{r}=0.66$, or repeatedly and independently perform Poisson disk selection operations for $\hat{r}=1$.

In another variation, the MEM 502 can relax the sample value placement rules described above. For instance, in an alternative case, the MEM 502 can allow a sample value associated with a cell to be placed outside the boundary of the cell. This approach can be achieved by increasing the scaling factor v in Equation (1). This option may improve the anti-aliasing performance of the MEM 502 (by more closely accommodating a Poisson distribution), but it may complicate the ability to retrieve sample values using random access. It may also complicate filtering operations (described in the next section).

In another variation, the MEM 502 can perform adaptive sampling instead of, or in addition to, the type of uniform sampling described above. This can be achieved by performing discrete dart throwing using a tree data structure instead of a grid structure. The use of tree structures in Poisson sampling is described in Li-Yi Wei, "Parallel Poisson Disk Sampling," *Proceedings of ACM SIGGRAPH* 2008, Vol. 27, Issue 3, August 2008.

In another variation, the MEM 502 can apply additional considerations in determining where to place the sample values. For example, the MEM 502 can consider image content when placing sample values. For example, the MEM 502 can bias the placement of sample values based on features within the image content, e.g., so that the selection of sample values are generally consistent with the features.

In another variation, the MEM 502 can create sample maps in higher dimensional space than the 2D example shown in FIG. 2. In a related variation, the MEM 502 can create sample maps that have a temporal component. For example, the MEM 502 can create sample maps that provide 2D collections of sample values over a span of time.

Figure 9:
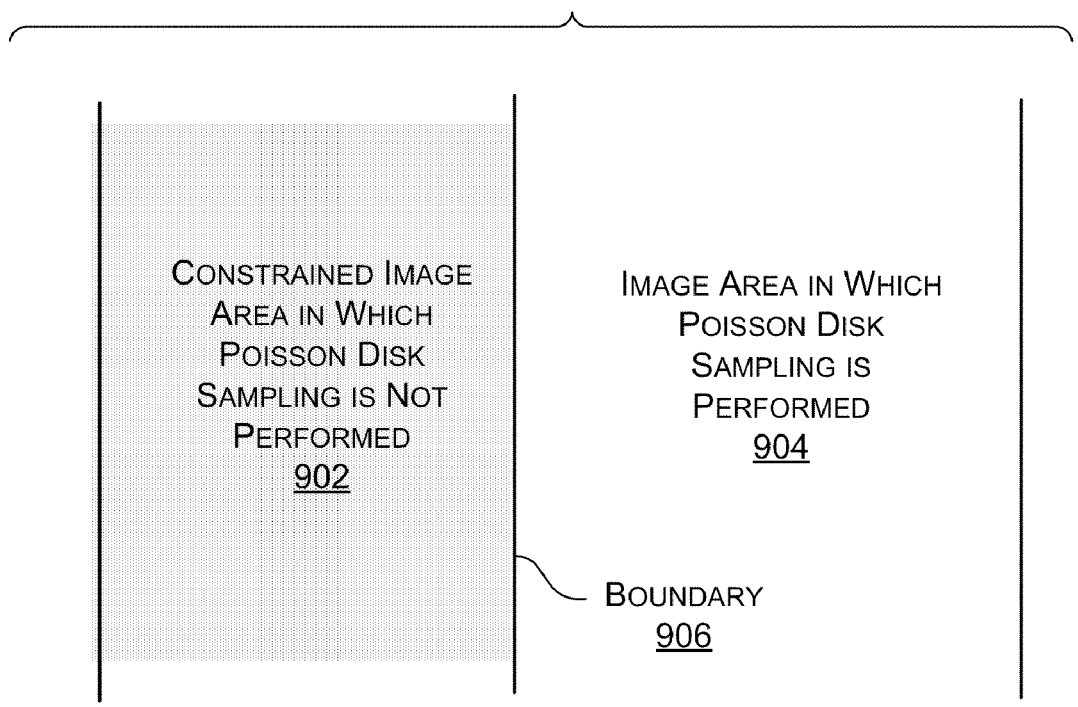
FIG. 9 is a graphical depiction that shows how the map encoding module of FIG. 3 can be selectively applied to a subset of sample values associated with an image.

In another variation, the MEM 502 can create a sample map in which part of the sample map is subject to the processing described above and another part is not. Consider, for example, FIG. 9. This figure shows image content that includes a constrained image area 902 in which Poisson disk sampling is not to be performed, and a Poisson image area 904 in which Poisson disk sampling is to be performed. The constrained image area 902 is separated from the Poisson image area 904 by a boundary 906. The MEM 502 can create a sample map that represents this image content by selectively applying the processing described in connection with FIG. 5 to the Poisson image area 904, but not the constrained image area 902. One advantage of this approach is that it reduces noisy edges around low frequency structured patterns. This approach may be appropriate in those cases in which the characteristics of image content can be assessed a priori.

More specifically, the MEM 502 can use regular grid sample values to represent the constrained image area 902 and Poisson disk sample values to represent the Poisson image area 904. This can be achieved during the encoding process by treating regular sample values along the boundary 906 as initial seed values. The MEM 502 can then add subsequent sample values from the Poisson image area 904 via the decreasing-r method described above. In this process, the MEM 502 can reserve a designated k value for the regular seed sample values, such as k=0. A similar methodology can be applied for other signal content using the Nyquist sampling rate as a selection criterion.

A.4. Illustrative Applications of the MEM and LDM

The MEM 502 and the LDM 802 can be used for different applications in different respective environments. For example, the MEM 502 and LDM 802 can be used in conjunction with different parts of a graphics processing pipeline to reduce aliasing in image content. For example, the MEM 502 and LDM 802 can be used to create and access sample maps associated with texture images, shadow maps, frame buffer content, render targets, rasterization-related content, and so on.

Figure 10:
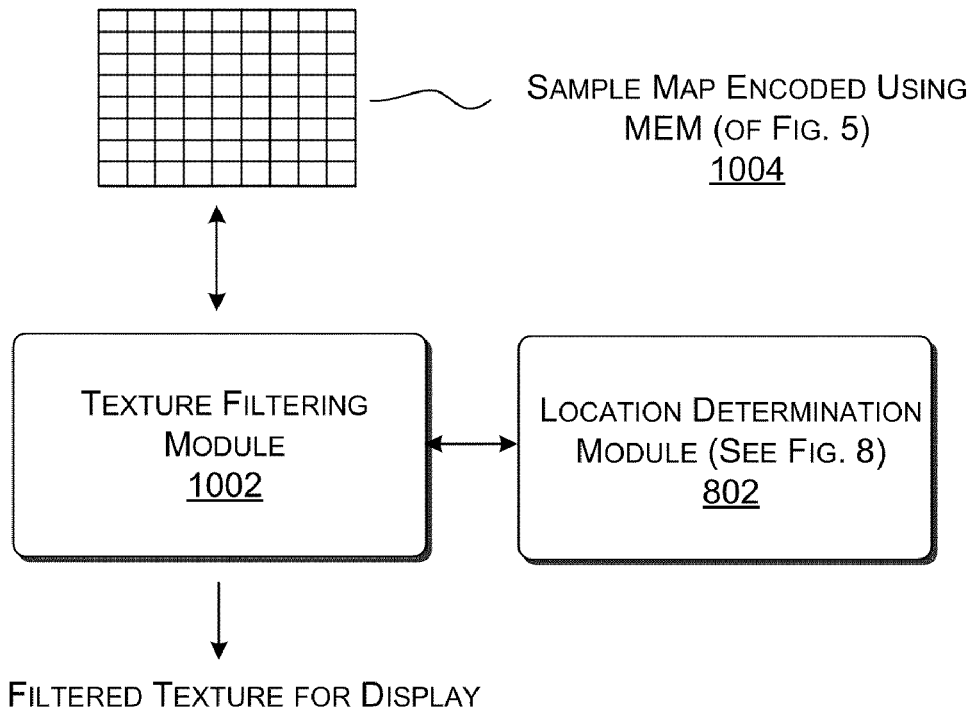
FIG. 10 shows an illustrative texture filtering module that can make use of the location determination module of FIG. 8.
Figure 11:
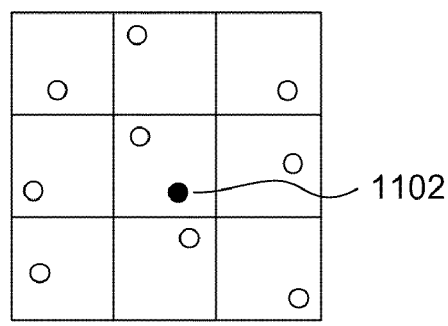
FIG. 11 shows a portion of a sample map with which the texture filtering module of FIG. 10 can interact.

FIG. 10 shows the application of the LDM 802 to a texture filtering operation. In this example, a texture filtering module 1002 works in conjunction with the LDM 802 to retrieve sample values from a sample map 1004. More specifically, in a texture filtering operation, the texture filtering module 1002 constructs a sample value at a query location (e.g., query location 1102 of FIG. 11) on the basis of nearby sample values within the sample map 1004. The texture filtering module 1002 can apply any mode or combination of modes to construct the sample value, such as, without limitation, a nearest neighbor technique, a linear technique, a MIPMAP technique, and so on. In performing the filtering operation, the texture filtering module 1002 consults the LDM 802 to determine the locations of samples values within the sample map 1004 (e.g., as represented by the dots in FIG. 11 having white centers).

The sample values in the type of sample map described above are provided within a regular organizing structure, but otherwise are stored at irregular locations. To address this irregularity, the texture filtering module 1002 takes into consideration a greater number of sample values compared to traditional texture filtering operations. For example, the texture filtering module 1002 may examine the sample values provided in the nine cells shown in FIG. 11, as opposed to the traditional case of four sample values. For example, in a traditional application of the nearest neighbor technique, a texture filtering technique can locate the nearest sample value to the query location 1102 in a straightforward manner; however, in the present context, the texture filtering module 1002 searches nine sample values surrounding the query location 1102 to locate the nearest neighbor.

For the linear filtering mode, the texture filtering module 1002 can examine five nearby sample values to decide which quadrant to use for interpolation. After identifying the containing quadrant, the texture filtering module 1002 can interpolate the final sample color value from the four sample values within the quadrant. In one representative implementation, the texture filtering module 1002 can use a mean value coordinate technique for performing interpolation.

For the MIPMAP filtering mode, the texture filtering module 1002 can build each MIPMAP level as an independent Poisson disk map. In this case, sample locations within each level are independent from those at other levels. However, to ensure color consistency, the texture filtering module 1002 can interpolate sample values of lower MIPMAP resolutions from the higher resolutions. Per-level nearest/linear filtering is performed as described above, and the final result is blended from two adjacent levels.

In addition, a graphics pipeline can produce an image from a sample map without performing filtering in the manner described above. This is appropriate in those cases in which the sample map stores a high quality representation of an image.

In addition to texturing, the type of sample map shown in FIG. 2 can be applied to a rasterization component (not shown) of a graphics pipeline (not shown). More specifically, a common practice in graphics hardware is to use a regular grid (or certain alternative regular pattern) for rasterizing geometry. However, regular sampling is known to be vulnerable to geometry aliasing. To address this issue, the functionality described above can be used to create and access a sample map in which rasterizer sample locations are distributed in a stochastic manner, rather than a regular grid pattern. The functionality can implement this operation using a programmable rasterizer or, in simulated fashion, using a geometry shader and/or pixel shader provided by a GPU.

For instance, an application component or the geometry shader can be configured to slightly enlarge each input triangle so that its screen projection is expanded one pixel per side to ensure proper coverage. This functionality can then pass down the three vertex positions via texture coordinates. A pixel shader can then be used to determine the ray direction from a Poisson disk sample map, perform ray-triangle intersection, and then render the pixel from the resultant intersection information.

B. Illustrative Processes

Figure 12:
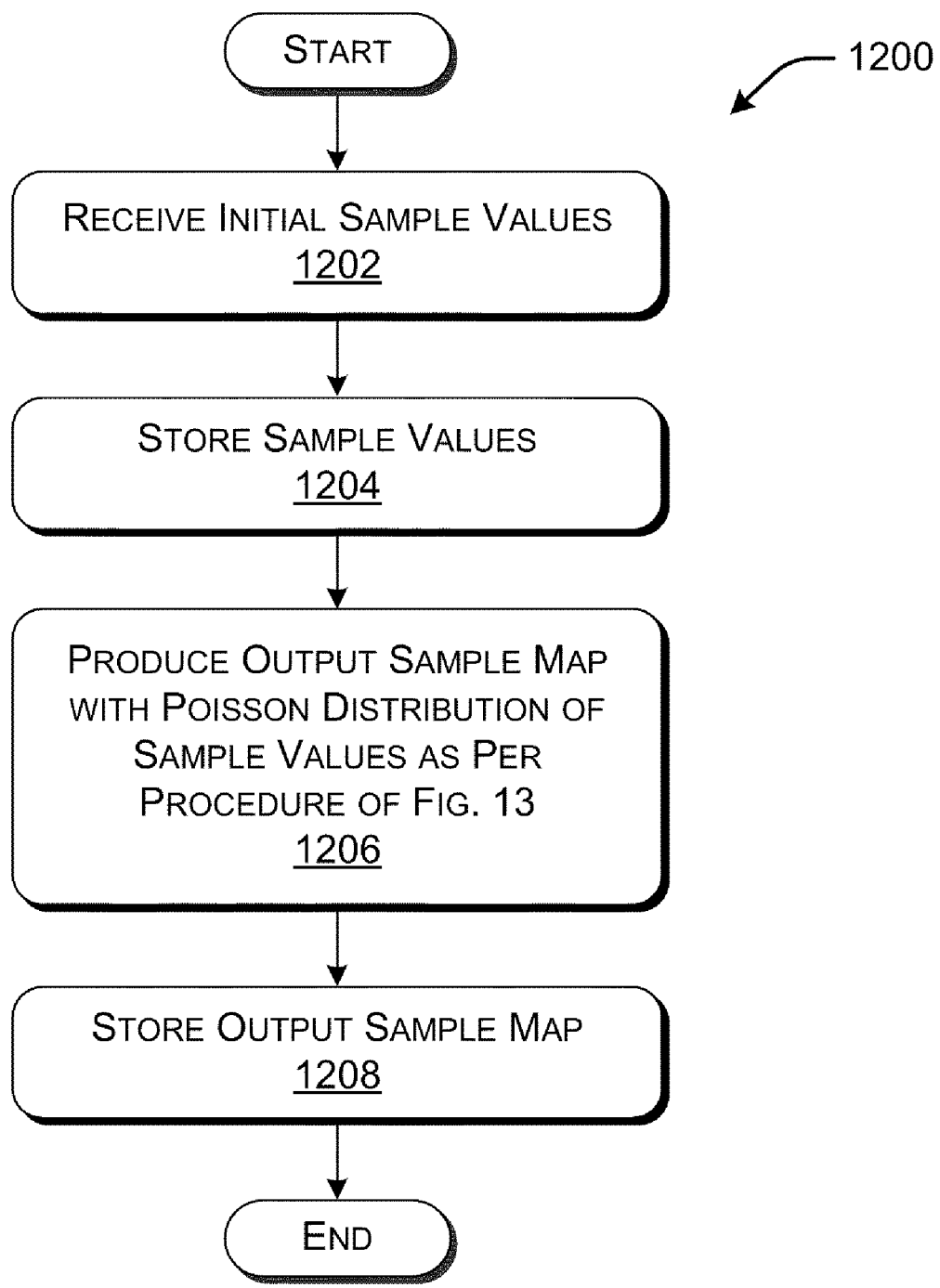
FIG. 12 shows an overview procedure that describes one manner of operation of the map encoding module of FIG. 3.
Figure 13:
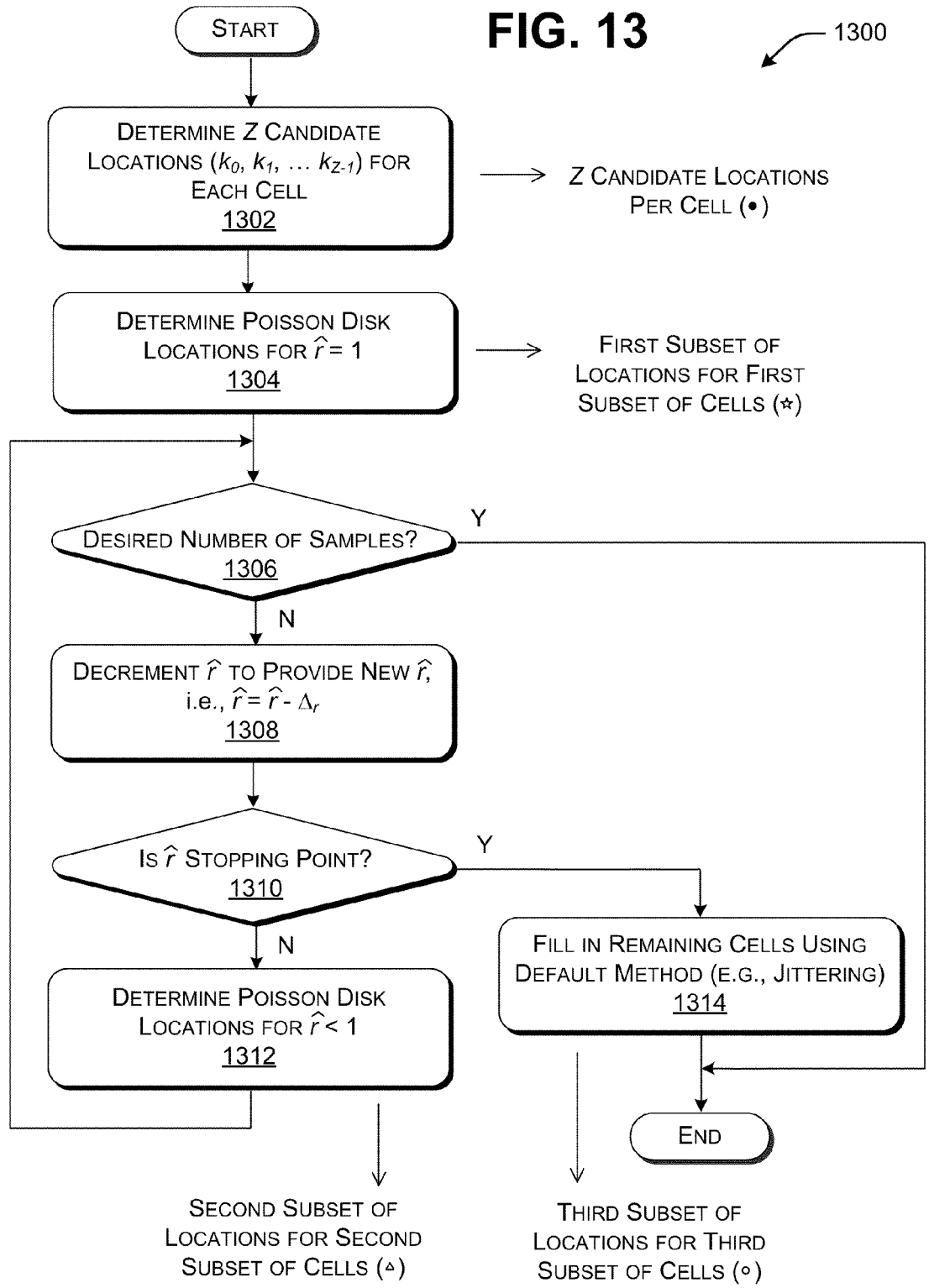
FIG. 13 shows an illustrative map creation procedure which provides additional details pertaining to the overview procedure of FIG. 12.
Figure 14:
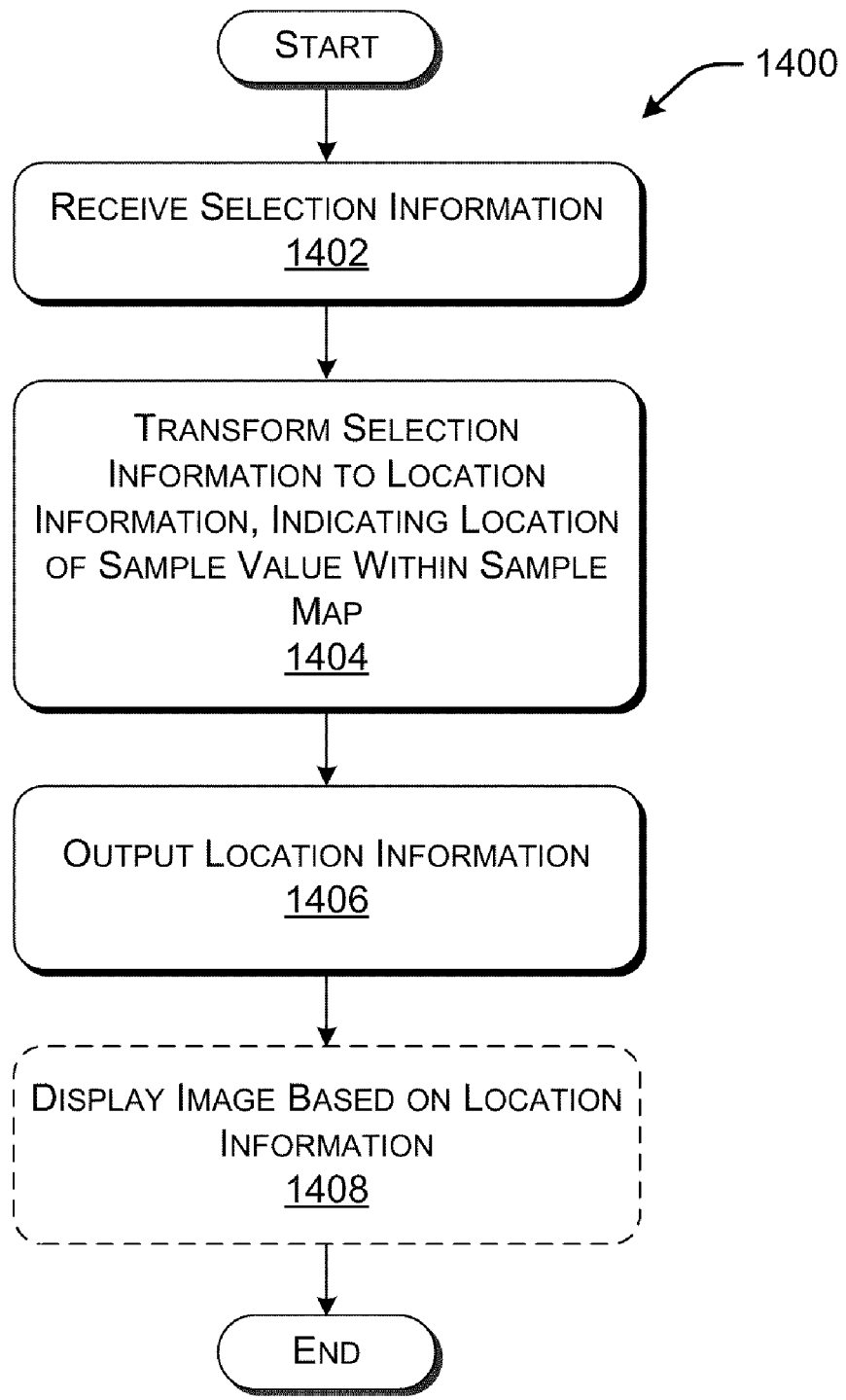
FIG. 14 shows an illustrative decoding procedure that describes how the location determination module of FIG. 8 can extract one or more sample values from a sample map.

FIGS. 12-14 show procedures that explain the operation of the systems of Section A. Since the principles underlying the operation of the systems have already been described in Section A, certain operations will be addressed in summary fashion in this section.

Starting with FIG. 12, this figure shows an illustrative procedure 1200 which describes an overview of the operation of the MEM 502 of FIG. 5.

In block 1202, the MEM 502 receives input information. For example, the MEM 502 can receive a set of initial sample values from which it constructs the sample map.

In block 1204, the MEM 502 optionally stores the input information.

In block 1206, the MEM 502 produces an output sample map in the manner described above in Section A.2.

In block 1208, the MEM outputs (and optionally stores) the sample map produced in block 1206.

FIG. 13 shows an illustrative procedure 1300 which provides additional information regarding the processing performed by the MEM 502 (of FIG. 5) in block 1206 of FIG. 12.

In block 1302, the MEM 502 determines, for each cell in the sample map, a plurality Z of candidate locations, e.g., $k_0$, $k_1, \ldots k_{Z-1}$. As described above, the MEM 502 selects from among these candidate locations in determining where to place the sample values within the sample map.

In block 1304, the MEM 502 selects a first subset of locations using a Poisson disk selection algorithm, such as a dart throwing algorithm. At this point, the radius value is set at $\hat{r}=1.0$. This radius value ensures that each cell contains at most one sample value, and that every sample value is located at least $r_{max}$ distance from all neighboring sample values (that have been selected at this point).

In block 1306, the MEM 502 optionally determines if a sufficient number of sample values has been selected after block 1304 has been performed. Assuming that the goal is to fill every cell with one sample value, then the decision in block 1306 will be answered in the negative.

In block 1308, the MEM 502 decreases the normalized radius value $\hat{r}$ by a prescribed decrement $\Delta_r$, such as 0.01.

In block 1310, the MEM 502 determines whether the normalized radius value $\hat{r}$ has been decreased to a terminal radius value $r_{stop}$. In one case, this terminal radius value is approximately 0.66.

In block 1312, assuming that the terminal radius value has not been reached, the MEM 502 performs another iteration of the Poisson disk selection algorithm, this time with a normalized radius value $\hat{r}$ that is less than 1. This process can be repeated a plurality of times with successively decreasing $\hat{r}$.

In block 1314, assuming that the terminal radius value has been reached, the sample value may still contain unfilled cells. If so, in block 1314, the MEM 502 invokes a default algorithm to fill in the remaining cells. For example, a jittering algorithm can be used to stochastically select from among the candidate locations.

FIG. 14 describes an illustrative procedure 1400 for retrieving a sample value from a sample map that has been created in the manner described above.

In block 1402, the LDM 802 (of FIG. 8) receives selection information. The selection information can define a k value associated with a particular cell, the texel coordinates ($t_x$, $t_y$) associated with the particular cell, and the global key value K.

In block 1404, the LDM 802 uses a decoding algorithm to transform the selection information into location information. The location information describes the actual location (x, y) of a sample value within the particular cell.

In block 1406, the LDM 802 outputs the location information and optionally stores the location information.

Block 1408 describes one possible application of the location information. In this case, a graphics application uses the location information to display an image based on the sample map.

C. Representative Processing Functionality

FIG. 15 sets forth illustrative electrical data processing functionality 1500 that can be used to implement any aspect of the functions described above. With reference to FIG. 5, for instance, the type of processing functionality 1500 can be used to implement any aspect of the MEM 502. With reference to FIG. 8, the processing functionality 1500 can be used to implement any aspect of the LDM 802. In one case, the processing functionality 1500 may correspond to any type of computer device that includes one or more processing devices.

The processing functionality 1500 can include volatile and non-volatile memory, such as RAM 1502 and ROM 1504, as well as various media devices 1506, such as a hard disk module, an optical disk module, and so forth. The processing functionality 1500 also includes one or more general-purpose processing devices 1508, as well as one or more special-purpose processing devices, such as one or more graphical processing units (GPUs) 1510. The processing functionality 1500 can perform various operations identified above when the processing devices (1508, 1510) execute instructions that are maintained by memory (e.g., RAM 1502, ROM 1504, or elsewhere). More generally, instructions and other information can be stored on any computer readable medium 1512, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1500 also includes an input/output module 1514 for receiving various inputs from an environment (and/or from a user) via input modules 1516 (such as one or more key input devices, one or more mouse-type input devices, etc.). The input/output module 1514 also provides various outputs to the user via output modules. One particular output mechanism may include a presentation module 1518 and an associated graphical user interface (GUI) 1520. The processing functionality 1500 can also include one or more network interfaces 1522 for exchanging data with other devices via one or more communication conduits 1524. One or more communication buses 1526 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving initial sample values;
storing the initial sample values in a store;
producing a sample map based on the initial sample values, the sample map including output sample values provided at respective locations within an organizing structure, the respective locations conforming, at least in part, to a Poisson disk distribution, the producing the sample map comprising:
selecting a first subset of the respective locations from candidate locations using a first radius value,
selecting a second subset of the respective locations from the candidate locations using a second radius value that is less than the first radius value, and
representing the respective locations with corresponding integer values that map to the respective locations when decoded by a decoding algorithm; and
storing the sample map, the sample map corresponding to image information for use by a graphics application in producing an electronic display,
wherein at least the producing is performed by one or more processing devices.

2. The method of claim 1, wherein the organizing structure includes a plurality of cells.

3. The method of claim 2, further comprising determining a number of the candidate locations associated with each cell in the organizing structure, wherein, for a particular cell, each candidate location is represented by an associated integer value that maps to a particular location within the particular cell when decoded by the decoding algorithm.

4. The method of claim 1, wherein:
the first subset of the respective locations are selected from the candidate locations using a Poisson disk selection algorithm operating based on the first radius value, and
the first subset of the respective locations corresponds to a first subset of the integer values.

5. The method of claim 4, wherein:
the first subset of the respective locations are selected from the candidate locations using the Poisson selection algorithm operating based on the second radius value, and
the second subset of the respective locations correspond to a second subset of the integer values.

6. The method of claim 5, wherein:
the organizing structure comprises a plurality of cells, and
the first radius value is selected such that the Poisson disk selection algorithm produces at most one sample value per cell in the organizing structure.

7. The method of claim 5, wherein said selecting the second subset of the respective locations comprises operating the Poisson disk selection algorithm with the second radius value and successive radius values that are smaller than the second radius value until a terminal radius value is reached.

8. The method of claim 7, wherein the terminal radius value corresponds to a normalized radius value of approximately 0.66.

9. The method of claim 5, wherein:
the producing the sample map further comprises selecting a third subset of the respective locations from the candidate locations using a default algorithm.

10. The method of claim 1, wherein the image information corresponds to texture information or rasterization information.

11. A method comprising:
receiving selection information;
using a decoding algorithm to transform the selection information into location information, the location information identifying a location of a sample value within a cell of a sample map; and
outputting the location information for use in generating an electronic display,
the selection information including:
cell location information which identifies the cell within the sample map;
an integer value associated with the location of the sample value within the cell; and
a global per-map key value,
wherein at least the using the decoding algorithm to transform the selection information is performed by one or more processing devices.

12. The method of claim 11, wherein the sample map includes sample values provided at respective locations, the respective locations conforming, at least in part, to a Poisson disk distribution.

13. The method of claim 11, wherein the decoding algorithm uses a cryptographic hash in providing the location information.

14. A method comprising:
receiving initial sample values;
storing the initial sample values in a store;
producing a sample map based on the initial sample values, the sample map including output sample values provided at respective locations within an organizing structure, the respective locations conforming, at least in part, to a Poisson disk distribution, the producing the sample map comprising:
selecting multiple subsets of the respective locations from candidate locations using successively smaller radius values, and
representing the respective locations with corresponding integer values that map to the respective locations when decoded by a decoding algorithm; and
storing the sample map, the sample map corresponding to image information for use by a graphics application in producing an electronic display,
wherein at least the producing is performed by one or more processing devices.

15. The method according to claim 14, wherein the selecting the multiple subsets using the successively smaller radius values continues until a terminal radius value is reached.

16. The method according to claim 15, wherein:
the producing the sample map further comprises, after selecting the multiple subsets of the respective locations, selecting another subset of the respective locations from the candidate locations using jittering.

17. A system comprising:
logic configured to:
obtain selection information,
use a decoding algorithm to transform the selection information into location information, the location information identifying a location of a sample value within a cell of a sample map, and
output the location information for use in generating an electronic display; and
one or more processing devices configured to execute the logic,
wherein the selection information includes:
cell location information which identifies the cell within the sample map;

an integer value associated with the location of the sample value within the cell; and a global per-map key value.

18. One or more computer-readable memory devices or storage devices storing instructions which, when executed by one or more processing devices, cause the one or more processing devices to perform acts comprising:

obtaining selection information;

using a decoding algorithm to transform the selection information into location information, the location information identifying a location of a sample value within a cell of a sample map; and outputting the location information for use in generating an electronic display, the selection information including:

cell location information which identifies the cell within the sample map;

an integer value associated with the location of the sample value within the cell; and a global per-map key value.

19. One or more computer-readable memory devices or storage devices storing instructions which, when executed by one or more processing devices, cause the one or more processing devices to perform acts comprising:

obtaining initial sample values;

producing a sample map based on the initial sample values, the sample map including output sample values provided at respective locations within an organizing structure, the respective locations conforming, at least in part, to a Poisson disk distribution, the producing the sample map comprising:

selecting multiple subsets of the respective locations from candidate locations using successively smaller radius values, and representing the respective locations with corresponding integer values that map to the respective locations when decoded by a decoding algorithm; and outputting the sample map, the sample map corresponding to image information for use by a graphics application in producing an electronic display.

20. A system comprising the one or more computer-readable memory devices or storage devices of claim 19 and the one or more processing devices.

* * * * *